(12) United States Patent
Vawter et al.

(10) Patent No.: US 8,971,714 B2
(45) Date of Patent: Mar. 3, 2015

(54) PHOTONIC CIRCUIT

(75) Inventors: Gregory A. Vawter, Corrales, NM (US); Jeff B. Lilley, Keller, TX (US); Anna M. Tauke Pedretti, Albuquerque, NM (US); Rick C. Jones, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 631 days.

(21) Appl. No.: 13/248,412

(22) Filed: Sep. 29, 2011

(65) Prior Publication Data

US 2013/0084074 A1 Apr. 4, 2013

(51) Int. Cl.
*H04B 10/00* (2013.01)
*H04B 10/2575* (2013.01)

(52) U.S. Cl.
CPC .................................. *H04B 10/2575* (2013.01)
USPC ............................. 398/116; 398/156; 398/25

(58) Field of Classification Search
CPC ........................................................ H04B 10/572
USPC ........................................... 398/116, 25, 156
See application file for complete search history.

(56) References Cited

U.S. PATENT DOCUMENTS

| | | | |
|---|---|---|---|
| 5,825,792 A | 10/1998 | Villeneuve et al. | |
| 7,254,290 B1 * | 8/2007 | Somerstein et al. | 385/14 |
| 2005/0078316 A1 * | 4/2005 | Ronnekleiv et al. | 356/478 |
| 2009/0036077 A1 * | 2/2009 | Woodward et al. | 455/205 |
| 2010/0278529 A1 * | 11/2010 | Weaver | 398/25 |

OTHER PUBLICATIONS

B.E. Little et al., Microring Resonator Channel Dropping Filters, Journal of Lightwave Technology, Jun. 1997, pp. 998-1005, vol. 15, No. 6.
B.E. Little et al., Very High-Order Microring Resonator Filters for WDM Applications, IEEE Photonics Technology Letters, Oct. 2004, p. 2263-2265, vol. 16, No. 10.
Brent Little et al., Tunable Narrow Band Filters for RF Photonics, IEEE, 2006, pp. 48-49.
Sai T. Chu et al., Temperature Insensitive Vertically Coupled Microring Resonator Add/Drop Filters by Means of a Polymer Overlay, IEEE Photonics Technology Letters, Sep. 1999, pp. 1138-1140, vol. 11, No. 9.
A. Tauke-Pedretti et al., Widely Tunable 10 Gbit/s Separate Absorption and Modulation Mach-Zehnder Wavelength Converter, Electronics Letters, May 2007, vol. 43, No. 10.

(Continued)

*Primary Examiner* — Danny Leung
(74) *Attorney, Agent, or Firm* — Reising Ethington P.C.; John J. Snyder

(57) ABSTRACT

An integrated or monolithic photonic circuit that modulates RF signals onto optical signals and then performs a channelizing filter function according to the RF content. According to an exemplary embodiment, the photonic circuit is employed in an aircraft system that includes a front end, a photonic circuit, an optical connection, and an electronic module at some distant location in the aircraft. RF signals are received by an antenna in the front end, the RF signals are then modulated onto optical signals by a modulator and a laser, the modulated optical signals are filtered by a filter array according to a channelizing filter function, and the modulated and channelized optical signals are then carried over the optical connection to the electronic module. Other options like a wavelength-tunable laser and corresponding feedback feature, as well as ring filters with integrated semiconductor optical amplifiers (SOAs) are also possible.

14 Claims, 4 Drawing Sheets

(56) References Cited

OTHER PUBLICATIONS

J.V. Hryniewicz, Higher Order Filter Response in Coupled Microring Resonators, IEEE Photonics Technology Letters, Mar. 2000, pp. 320-322, vol. 12, No. 3.

Seung June Choi et al., A High-Q Wavelength Filter Based on Buried Heterostructure Ring Resonators Integrated with a Semicondctor Optical Amplifier, IEEE Photonics Technology Letters, Oct. 2005, pp. 2101-2103, vol. 17, No. 10.

Dominik G. Rabus et al., Optical Filters Based on Ring Resonators with Integrated Semiconductor Optical Amplifiers in GaInAsP—InP, IEEE Journal of Selected Topics in Quantum Electronics, Nov./Dec. 2002, pp. 1405-1411, vol. 8, No. 6.

Erik J. Skogen et al., Monolithically Integated Active Components: A Quantum-Well Intermixing Approach., IEEE Journal of Selected Topics in Quantum Electronics, Mar./Apr. 2005, pp. 343-355, vol. 11, No. 2.

James W. Raring et al., 40-Gb/s Widely Tunable Transceivers, IEEE Journal of Selected Topics in Quantum Electronics, Jan./Feb. 2007, pp. 3-14, vol. 13, No. 1.

James W. Raring et al., 40-Gb/s Widely Tunable Low-Drive-Voltage Electroabsorption-Modulated Transmitters, Journal of Lightwave Technology, Jan. 2007, pp. 239-248, vol. 25, No. 1.

P. Dong et al., A Tunable Optical Channelizing Filter Using Silicon Coupled Ring Resonators, IEEE, 2010.

G. Allen Vawter et al., Wide Dynamic Range of Ring Resonator Channel-Dropping Filters with Integrated SOAs.

\* cited by examiner

PHOTONIC CIRCUIT

TECHNICAL FIELD

The present invention relates generally to photonic circuits and, more particularly, to photonic circuits that receive radio frequency (RF) energy or signals as input and provide channelized optical energy or signals as output.

BACKGROUND

Carrying radio frequency (RF) energy across certain distances can present potential challenges. For instance, in an aircraft system, carrying RF energy from an antenna installed out on a wing or tail of the aircraft to an electronic module located within the fuselage can result in increased manufacturing cost and complexity. The RF antenna is typically connected to the remotely-located electronic module by large bundles of delicate, high-performance coaxial cables that are routed through tight and harsh areas of the aircraft. Properly installing and testing these cable bundles can be a tedious and complicated task that may add cost and complexity to the manufacturing process.

Replacing the bundles of coaxial cables with fiber or other optical connections could address some of the challenges mentioned above, but up to now it has been difficult for optical connections to meet the signal integrity requirements of such systems.

SUMMARY

According to one aspect, there is provided a photonic circuit, comprising: a circuit input, a modulator, an optical source, a filter array, and a circuit output. The modulator is coupled to the circuit input and receives radio frequency (RF) signals. The optical source is coupled to the modulator and provides optical signals, and the modulator and the optical source work together to modulate the radio frequency (RF) signals received from the circuit input onto the optical signals provided by the optical source. The filter array is coupled to the optical source and receives the optical signals, and the filter array includes a plurality of filters that channelize the optical signals received from the optical source in order to provide channelized optical signals. The photonic circuit provides for the transmission of radio frequency (RF) content in the optical domain.

According to another aspect, there is provided a photonic circuit, comprising: a circuit input, a modulator, an optical source, a filter array, and a circuit output. The modulator is coupled to the circuit input and receives radio frequency (RF) signals. The optical source is coupled to the modulator and provides optical signals, the modulator and the optical source work together to modulate the radio frequency (RF) signals received from the circuit input onto the optical signals provided by the optical source. The filter array is coupled to the optical source and receives the optical signals, the filter array includes a plurality of filters that filter the optical signals received from the optical source according to their radio frequency (RF) content in order to provide filtered optical signals. The modulator, the optical source and the filter array are all fabricated on a single, integrated chip.

According to yet another aspect, there is provided a method for operating a photonic circuit. The method may comprise the steps of (a) receiving radio frequency (RF) signals as input; (b) modulating the radio frequency (RF) signals onto optical signals, wherein the modulated optical signals are generated by a wavelength-tunable laser; (c) adjusting a center wavelength of the wavelength-tunable laser, wherein the center wavelength is adjusted with a feedback feature that is coupled to the output of the wavelength-tunable laser; (d) channelizing the modulated optical signals according to their radio frequency (RF) content; and (e) providing modulated and channelized optical signals as output.

DRAWINGS

These and other objects, features and advantages will be apparent from the following detailed description of the preferred embodiments and best mode, the appended claims, and the accompanying drawings, in which:

DESCRIPTION OF EMBODIMENTS

Figure 1:
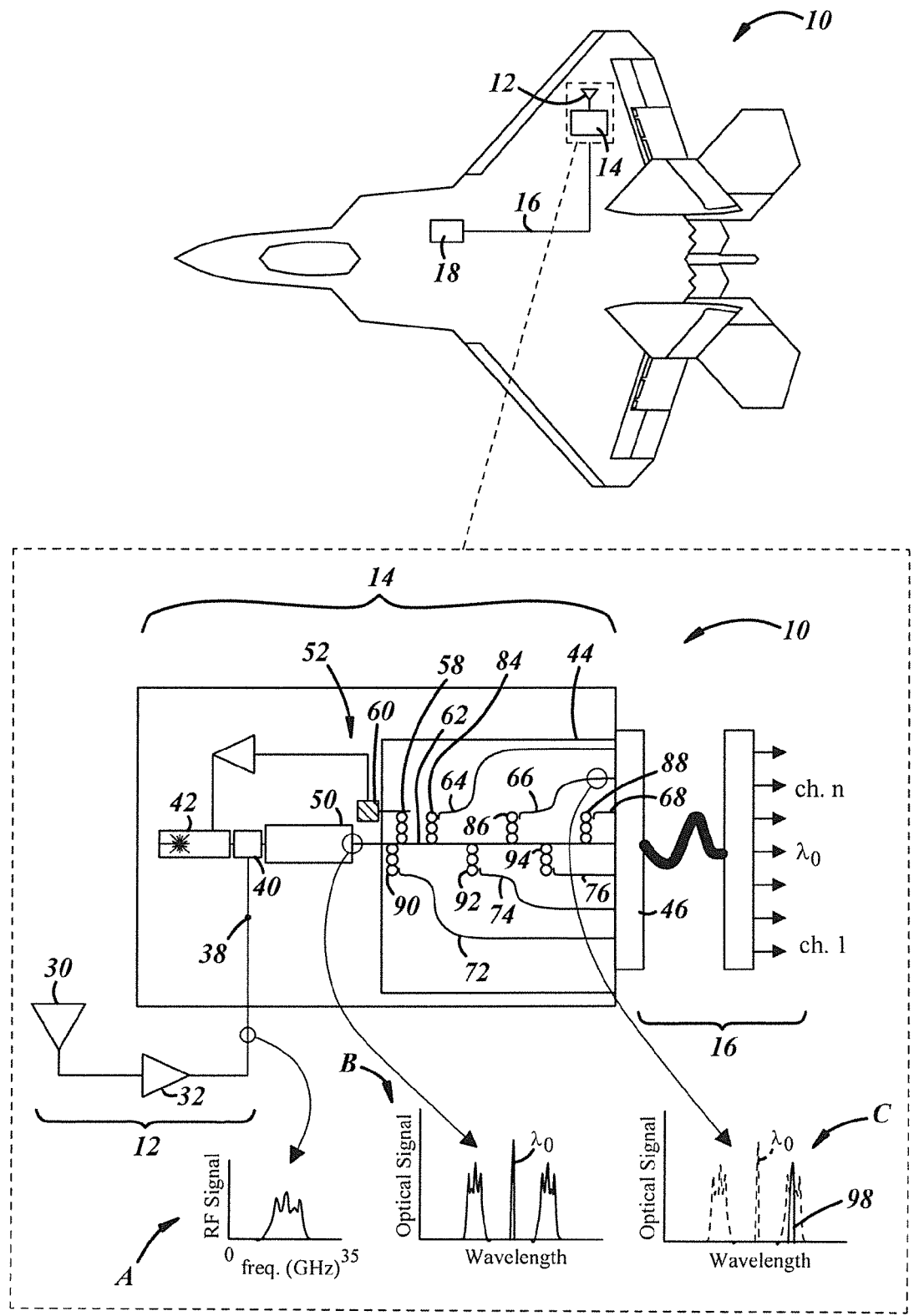
FIG. 1 shows a schematic view of an exemplary embodiment of an aircraft that includes an aircraft system having a photonic circuit, and a magnified view in which the photonic circuit is shown in greater detail.

A photonic circuit is disclosed herein that modulates radio frequency (RF) energy and/or signals onto optical energy and/or signals for transmission over an optical connection such as one made from fiber optics. The photonic circuit may be a small, lightweight monolithic photonic integrated circuit (PIC) that modulates RF signals onto optical signals and then performs a channelizing filter function according to the RF content. The photonic circuit may be used with any number of applications including, but certainly not limited to, manned aircraft, unmanned aircraft, satellites, vehicles, ships, antenna systems, communication networks, medical applications, surveillance and monitoring systems, etc. With reference to FIG. 1, there is shown an exemplary illustration of an aircraft system 10 that includes a front end 12, a photonic circuit 14, an optical connection 16, and an electronic module 18 located somewhere in the aircraft. Generally speaking, RF signals are received by front end 12 through an antenna, the RF signals are modulated onto optical signals and are filtered according to a channelizing filter function by photonic circuit 14, and the channelized optical signals are then carried over optical connection 16 to electronic module 18, which may be located in a different part of the aircraft. Photonic circuit 14 may help the aircraft system realize certain advantages associated with transmitting RF content in the optical domain.

Front end 12 is designed to receive and/or process incoming energy, typically in the form of radio frequency (RF) signals, before providing the incoming energy to photonic circuit 14. According to the particular embodiment shown in FIG. 1, front end 12 includes an RF antenna 30 coupled to an amplifier 32, but skilled artisans will appreciate that any number of different front ends may be used and that system 10 is not limited to the particular embodiment shown here. For example, front end 12 may include any combination of communication components, including antennas, impedance matching circuits, filters, amplifiers and/or mixers, to cite a few examples.

As mentioned above, once the RF signals have been modulated and channelized by photonic circuit 14, they may be carried over optical connection 16 to electronic module 18 or some other destination. Optical connection 16 is designed to carry or transmit the output from photonic circuit 14 to electronic module 18 and it may include one or more individual conductors, waveguides and/or other conduits. In one example, optical conductor 16 is coupled to circuit output 46 and includes a set of parallel optical waveguides that carry filter output and the unmodulated center frequency of the laser. The parallel optical waveguides may be provided in the form of a 1×n fiber ribbon with n channels corresponding to the channelized output of the photonic circuit. The center frequency of the laser is provided so that it can be mixed with any of the RF signal output channels to recover the initial RF content. In the case where the data of interest is simply a measure of the RF power in each channel, such mixing may not be required. Electronic module 18 may be located at a distant location in the aircraft and can include any electronic component, module, system and/or combination thereof, as it is meant to encompass all possible destinations that may use or require the optical signals from photonic circuit 14. The present invention is not limited to any particular embodiment of the front end, the photonic circuit, the optical connection and/or the electronic module, as numerous variations may be used.

Turning now to photonic circuit 14, the photonic circuit is designed to process radio frequency (RF) signals so that the RF content can be transmitted in the optical domain. In an exemplary embodiment, photonic circuit 14 is a small, lightweight photonic integrated circuit (PIC) that is coupled to front end 12 on an input side and optical connection 16 on an output side, and the photonic circuit modulates RF signals onto optical signals and then filters the optical signals according to the RF content. One way for photonic circuit 14 to filter the optical signals is through a process called "channelizing" or "RF channelizing," which involves separating a complex signal into a number of channelized frequency bands each having a bandwidth and a center frequency. The potential applications for channelizing are widespread in both the military and the civilian realms. For example, channelizing may be used by aircraft to monitor RF radiation in the surrounding environment for particular frequencies of interest in order to receive and process transmitted information or guide action, such as that pertaining to electronic jamming or weapon guidance systems. According to the exemplary embodiment illustrated in FIG. 1, photonic circuit 14 includes a circuit input 38, a modulator 40, an optical source 42, a filter array 44, and a circuit output 46.

Circuit input 38 may receive radio frequency (RF) signals and/or other radiation, and generally acts as an input for photonic circuit 14. According to the exemplary embodiment shown in FIG. 1, circuit input 38 is coupled between front end 12 and modulator 40 and provides the modulator with RF signals that are gathered by antenna 30 and amplified by amplifier 32. An illustration of some exemplary RF signals that could be received by circuit input 38 are shown at A in FIG. 1. Circuit input 38 may be directly or indirectly coupled to modulator 40, and it may be coupled to the modulator according to any number of known technologies, to cite several possibilities.

Modulator 40 may modulate or otherwise process radio frequency (RF) signals onto optical signals so that RF content can be transmitted in the optical domain. This may be performed according to any number of known technologies, including providing modulator 40 as an optical absorption modulator or a Mach-Zehnder Interferometer that uses RF signal amplitude modulation. In one example, modulator 40 is coupled to both circuit input 38 and optical source 42 and uses the RF signals from the circuit input to modulate the output of the optical source, which may be a laser. In this way, the RF content initially received by front end 12 can be modulated onto optical signals for subsequent processing and/or transmission in the optical domain. An illustration of some exemplary optical signals that could be the result of modulator 40 are shown at B in FIG. 1, where the frequency spectra of the initial RF signals is carried as spectral sidebands on the optical signal center wavelength. It should be appreciated that other devices and/or techniques for modulating or otherwise converting the RF signals into the optical domain may be used and that modulator 40 is not limited to the example provided here.

Optical source 42 may include any type of suitable device capable of generating or emitting optical energy or signals, such as a laser. According to one example, optical source 42 is a high-speed, wavelength-tunable diode laser that emits light modulated with the radio frequency (RF) content provided by front end 12. It is possible for optical source 42 to be integrated with filter array 44 so that both components are fabricated on the same wafer or chip (e.g., an Indium Phosphide (InP) wafer), or the optical source and filter array may be formed on separate chips (e.g., InP and silicon (Si) wafers) and coupled together. The integrated example may enjoy benefits in terms of lower packaging costs and lower optical losses, as laser 42 and filter array 44 reside on the same chip. In addition, an integrated or monolithic circuit experiences roughly the same thermal environment (i.e., iso-thermal), which can aid in addressing phenomena like thermal drift, as subsequently explained in more detail. In those instances where the laser is formed on a separate chip from the filter array, different optical components may be needed to optically couple the two chips together. It is possible to optically couple the output from laser 42 on one chip to filter array 44 on another chip in a manner that maintains the two chips in a relatively iso-thermal condition. One potential way of doing so involves the use of an adiabatic tapered mode expander to match or otherwise go between the two chips. But other arrangements, components and/or devices may be used instead. Optical source 42 may be provided in any number of suitable embodiments and is certainly not limited to the examples provided herein.

Filter array 44 may filter, channelize, bin or otherwise process the modulated optical signals from optical source 42. In one example, filter array 44 is a cascaded filter arrangement that selects out or parses out individual channels of the optical input according to its radio frequency (RF) content, where each channel has a certain center frequency and bandwidth. Thus, the overall output from filter array 44, which is in the form of optical signals channelized according to their RF content, may include all of the separate channels and the unmodulated center frequency of the laser. Filter array 44, according to one embodiment, is monolithically integrated or formed on a single wafer with circuit input 38, modulator 40, optical source 42 and circuit output 46, and includes a feedback feature 52, a number of optical waveguides 62-74, and a number of optical filters 84-94 arranged as an optical passband filter array.

Feedback feature 52 may be used to correct, adjust or otherwise modify one or more aspects of the optical source output. For instance, feedback feature 52 may be optically coupled to the output of laser 42 and provide the laser with a center wavelength feedback signal that can be used to adjust the laser and take into account factors such as thermal drift. Under this scheme, a fixed filter channel is used to tap out or extract a portion of the optical output from laser 42 so that the center wavelength of the laser can be locked to the center frequency of the filter array. Although feedback feature 52 may be provided according to a number of different embodiments, the example shown in FIG. 1 includes a feedback filter 58, a photodiode 60 and a feedback loop connected to optical source 42. Feedback filter 58 may be a ring filter corresponding to a fixed filter channel that taps out optical signals from the output of the laser and provides them to photodiode 60, so that the photodiode can determine when the laser is operating at the center frequency of filter array 44. Photodiode 60 may act as a photodetector and provide a current or voltage that peaks when the laser is operating at the center frequency of filter array 44. This, in turn, may be used for wavelength control to account for changes in the center wavelength of the laser due to temperature variations, radiation and/or other environmental conditions. As mentioned above, optical source 42 may be a wavelength-tunable diode laser that can be tuned over a center wavelength range of 6 nm, for example. One technique for adjusting or tuning the lasing wavelength involves the use of electrical control of phase shift and/or mirror section internal to the laser, as is understood by those skilled in the art. One or more components of feedback feature 52 may be integrated with optical source 42 and/or filter array 44 so that they are "on-chip," but this is not necessary. In one embodiment, feedback filter 58 and photodiode 60 are formed on the same chip as optical source 42 and filter array 44, but the feedback loop and corresponding circuitry is formed "off-chip;" other embodiments are certainly possible.

In another potential embodiment of feedback feature 52, the feedback filter is tuned to be just off to one side of the center wavelength of the filter array. In this way, the feedback loop moves up and down the sloped side of the filter response (not the peak). One potential advantage of such an arrangement is that it may be helpful in determining which way to correct the wavelength (hi or low), but it may also require an additional filter running centered on the wavelength so that it is known when it is at the correct wavelength. It is also possible to run the filter centered and then use dithering of the filter wavelength so that the AC phase of the signal indicates which way to tune, while still retaining the response that is desired.

Optical waveguides 62-76 may guide, conduct or otherwise carry optical signals within filter array 44, and may be provided according to any number of suitable embodiments. In the exemplary embodiment illustrated in FIG. 1, optical waveguides 62-76 are coupled to optical filters 84-94 and may include InGaAsP or silica planar lightwave output channels. The main optical waveguide 62 is optically coupled to all of the optical filters and carries the optical signals from the laser to the different filters so that each filter can tap out or extract those portions of the optical energy that fall within their respective, narrow pass bands. Optical waveguides 64-76 convey filter output from optical filters 84-94, respectively. It is preferable that the optical waveguides be integrally formed with the rest of the components of filter array 44 so that they form a single monolithic chip. Those skilled in the art will appreciate that a number of different types of optical waveguides or optical connections may be used, as filter array 44 is not limited to the particular embodiments described herein.

Optical filters 84-94 may be arranged in order to filter the modulated optical signals according to their radio frequency (RF) content for purposes of channelizing or binning. In one potential embodiment, each of the optical filters 84-94 is a ring filter or RF ring resonator filter that separates and places the information inside its passband on a "drop channel" and places the information outside its passband on a "bus channel" that is independent of the input waveguide. This is somewhat different than reflective-type filters that return the bus channel back to the input waveguide; that is not to say, however, that reflective-type filters could not be used. Ring resonator chains can be designed for complex filter shapes with varying bandwidths, where the narrowness of the passband is generally limited by the internal optical loss of the ring. Optical filters 84-94 may exhibit passbands having bandwidths in the MHz or even GHz. Skilled artisans will appreciate that ring resonator filters can be sensitive and susceptible to temperature variations, with center frequency drift rates of several GHz per degree Celsius. One example of a suitable ring filter is an InGaAsP multi-ring cavity (e.g., two- or three-ring cavity) active RF-optical filter that has semiconductor optical amplifiers (SOAs) embedded within each ring cavity of the filter; however, other optical filters may be used instead.

Optical filters 84-94 may be sensitive to temperature variation, exposure to certain radiation and/or other environmental factors. Photonic circuit 14 minimizes the effects of these phenomena by using a wavelength-tunable diode laser and feedback feature 52, as explained above in more detail. This approach is generally more effective when all of the components involved (i.e., the laser, the modulator, the individual filters of the filter array, etc.) are integrated onto a single monolithic chip so that they experience similar environmental conditions. Some examples of suitable materials that may be used to provide an integrated chip solution include group III-V semiconductor heterostructures. For the 1.3 μm or 1.5 μm telecom-associated wavelengths, for example, a heterostructure of InGaAsP on an InP substrate may be used. Use of other heterostructures for these and other wavelengths and applications may be known to those skilled in the art and may be employed here as well. Another potential way for reducing the environmental sensitivity of the optical filters involves the use of polymer films attached to the surface where the presence of the polymer reduces the overall thermal coefficient; examples of such films include those made of glass and polymer materials where low losses enable high-performance resonators.

Figure 2:
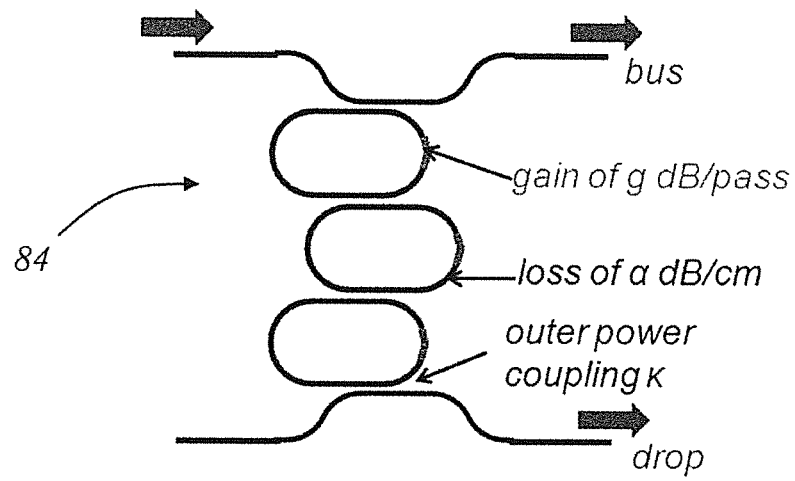
FIG. 2 shows a schematic view of an exemplary ring filter that may be used in a photonic circuit such as the one of FIG. 1.
Figure 4:
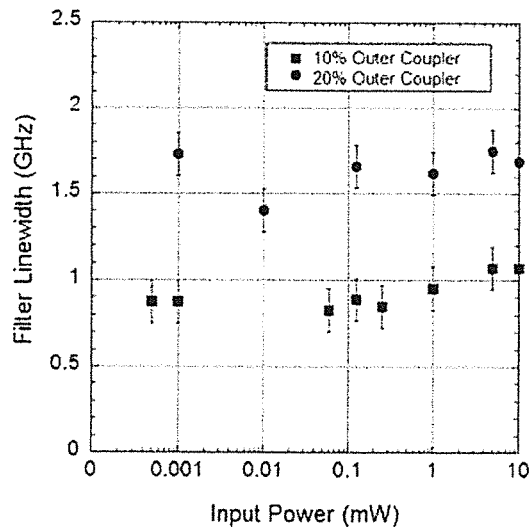
FIG. 4 shows a graph simulating the performance of the ring filter of FIG. 2, where the graph plots input power (mW) versus filter linewidth (GHz)

As mentioned above, each of the optical filters 84-94 may include a semiconductor optical amplifier (SOA) embedded within each ring cavity of the filter. Both ridge-type and buried-heterostructure (BH) waveguides could be used to form active ring resonators, where most of the ring length has SOAs to create internal optical gain, potentially offsetting certain passive losses. While these active rings with long SOAs may succeed in creating low-loss, narrow bandwidth filters, such large SOAs can potentially create unacceptable spontaneous emission noise in the filter output that figures in the filter performance for certain radio frequency (RF) applications. The exemplary optical filters 84-94 attempt to keep the SOA active volume at a minimum so as to reduce the generation of spontaneous emission noise. FIG. 2 shows one potential embodiment where optical filter 84 has a small SOA (e.g., less than 25% of the overall ring length), which provides only enough gain to nearly offset the passive loss of the remainder of the ring; completely offsetting the loss or even creating net gain is possible, but can lead to noisy operation or even lasing of the ring. Use of a low-active-volume SOA inside an otherwise passive ring can lead to the simulated results shown in FIG. 3, where the signal-to-noise ratio (SNR)

is plotted for a 3-ring optical filter as a function of the input optical power. Passive portions of the rings may be formed by quantum well intermixing (QWI). A signal-to-noise ratio (SNR)>10 dB may be attained for a wide range of input powers, as demonstrated by the graph. Turning to FIG. 4, there is shown the filter bandwidth or linewidth for two different designs of 3-ring active filters using the same basic structure as shown in FIG. 2, where 1 GHz filter bandwidths are attained with high SNR. More information regarding potential embodiments of ring filters having integrated semiconductor optical amplifiers (SOAs) can be found in the paper entitled *Wide Dynamic Range of Ring Resonator Channel-Dropping Filters with Integrated SOAs*, which is attached as Appendix A and is incorporated herein by reference.

Figure 3:
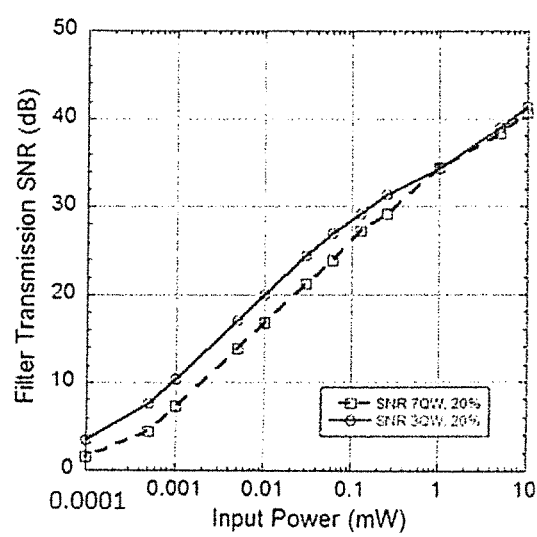
FIG. 3 shows a graph simulating the performance of the ring filter of FIG. 2, where the graph plots input power (mW) versus filter transmission signal-to-noise-ratio (SNR)
Figure 5:
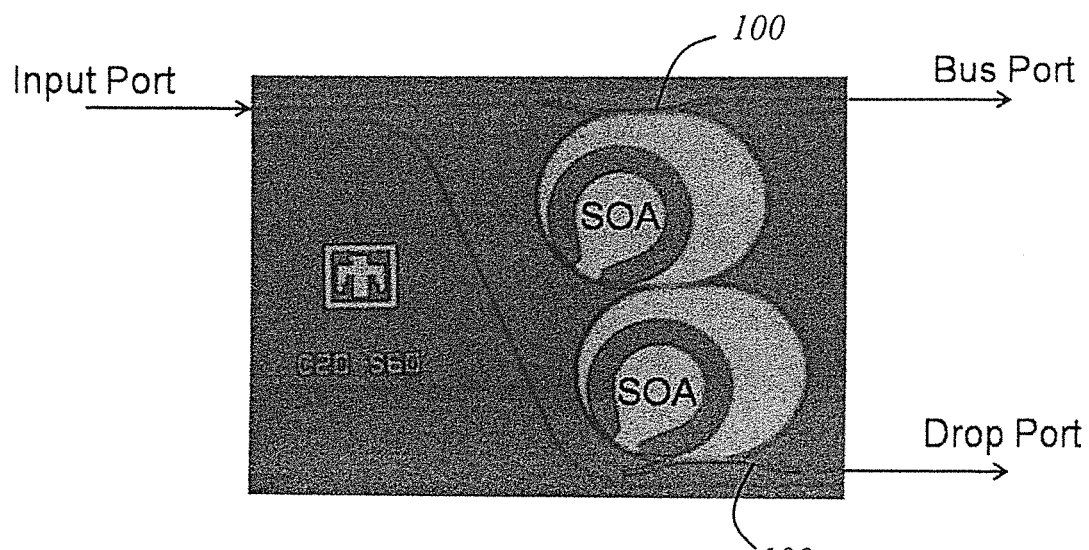
FIG. 5 shows a micrograph of an exemplary two-ring active channelizing optical filter that may be used in a photonic circuit such as the circuit of FIG. 1.
Figure 6:
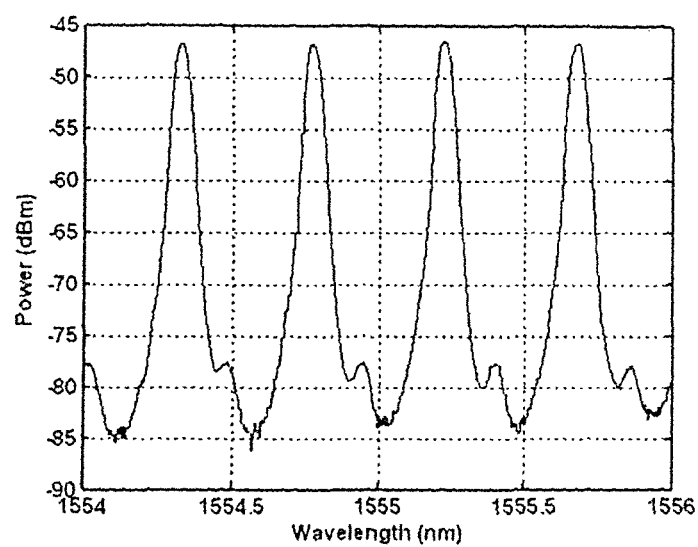
FIG. 6 shows a graph illustrating the performance of the ring filter of FIG. 5, where the graph plots wavelength (nm) versus power (dBm).

FIGS. 2-4 are generally directed to optical filter embodiments that use buried-heterostructure (BH) waveguides. Depending on the particular embodiment, BH waveguides may be preferred over ridge-type waveguides for their high degree of process tolerance in fabrication of precision optical couplers and for their low bend radiation loss at ring sizes with 20-100 GHz free spectral range. It is also possible to use dual-ring active InGaAsP/InP BH waveguide filters with short semiconductor optical amplifiers (SOAs). An image of an exemplary optical filter according to this technology is seen in FIG. 5, and measured filter performance for the same is illustrated in FIG. 6. In this example, the SOAs are approximately 60 μm long and the ring radius is about 200 μm. Other embodiments may have an SOA length down to as little as 10 μm for the same ring radius, for example. Testing has shown a 3 GHz bandwidth with greater than 35 dB contrast in transmission between on- and off-resonance input wavelengths, and a free spectral range of 56 GHz. In FIG. 5, additional contact pads 100 covering the bulk of the rings are used for electro-optic, in this case by current injection, tuning of the ring resonance frequency and may enable the filter center frequency to be fine-tuned and, to a lesser extent, the bandwidth to be fine-tuned after fabrication.

Turning back to FIG. 1, consider the non-limiting example where laser 42 emits RF-modulated optical signals having an adjusted center wavelength of λ (i.e., a center frequency f=c/λ) and each of the ring filters 84-94 has a narrow passband of approximately 2 GHz and are separated from one another by 2 GHz. As the optical signals from the laser are guided along main optical waveguide 62, ring filter 84 extracts the portion of the optical signals corresponding to a first passband [f−(f+2 GHz)], ring filter 86 extracts the portion corresponding to a second passband [(f+2 GHz)−(f+4 GHz)], ring filter 88 extracts the portion corresponding to a third passband [(f+4 GHz)−(f+6 GHz)], ring filter 90 extracts the portion corresponding to a fourth passband [(f+6 GHz)−(f+8 GHz)], ring filter 92 extracts the portion corresponding to a fifth passband [(f+8 GHz)−(f+10 GHz)], and ring filter 94 extracts the portion corresponding to a sixth passband [(f+10 GHz)−(f+12 GHz)]. In this manner, the radio frequency (RF) content, as originally received at front end 12, is used to parse out or divide the overall optical signals into individual channels having separate narrow frequency passbands (e.g., from 100 MHz to 10 GHz) so that the overall bandwidth of filter array is suitable (e.g., 12 GHz). This concept is illustrated at C in FIG. 1, where an exemplary passband 98 is shown overlapping with a portion of a spectral sideband. The various optical filters 84-94 should be provided with passbands that are set off to the side of the center frequency of the laser in order to pick off their respective channels. The ring filters in the example above only work the upper side bands, however, it is possible for the filters to work both the upper and lower side bands. It should be appreciated that filter array 44 is not limited to a cascaded arrangement with six optical filters, as in the example above, as the filter array may include either more or fewer than six optical filters.

Circuit output 46 may receive modulated and channelized optical signals from filter array 44, and generally acts as an output for photonic circuit 14. According to the exemplary embodiment shown in FIG. 1, circuit output 46 is coupled between filter array 44 and optical connection 16 and may include one or more multiplexing elements. An illustration of some exemplary optical signals that could be received by circuit output 46 are shown at C in FIG. 1. Circuit output 46 may be directly or indirectly coupled to optical connection 16 and it may be coupled according to any number of known technologies, as the circuit output is not limited to any particular design.

During operation of aircraft system 10, radio frequency (RF) energy or signals are received at front end 12 and provided to photonic circuit 14 at circuit input 38. The RF signals are used by modulator 40 and optical source 42, which may be a high-speed wavelength-tunable laser, to modulate the RF content onto one or more optical signals produced by the laser. The modulated optical signals are then provided to filter array 44, which uses a cascaded filter arrangement to channelize or bin the optical signals into a number of individual channels that are determined according to the RF content of the signals. Filter array 44 may optionally include a feedback filter 52 that uses a photodiode to determine the center frequency of optical source 42 and to lock that center frequency to the filter array in order to address factors such as thermal drift and the like. The modulated and channelized output from filter array 44 is conveyed to optical connection 16 via circuit output 46, where it may be multiplexed or otherwise packaged for transmission to electronic module 18 which may be located at some distant location in the aircraft.

During manufacture of the photonic circuit, modulator 40, optical source 42, filter array 44 and/or feedback feature 52 may be fabricated or otherwise integrated onto a single monolithic structure (e.g., a single block of crystal which is generally homogeneous). In order to integrate all of these components, a ridge-waveguide-type laser, a modulator and a photodiode formed by quantum-well intermixing (QWI) may be used. Multi-section lasers and on-chip modulators may be suitable, with a wide wavelength tuning range and >30 GHz RF modulation frequency response. Such devices can use the same centered multi-quantum-well active layer set as does the filter array, with varying degrees of QWI used to define passive waveguides and modulators. A tapered mode converter may be used to efficiently transfer the modulated laser light from the ridge waveguide to the buried heterogeneous (BH) waveguides of the filter array or filter bank.

Providing photonic circuit 14 in the form of a single-chip or integrated solution may shrink the size and weight of the device, reduce power consumption and/or improve the robustness of the circuit by keeping the number of optical interconnections low. All of these attributes may combine to allow aircraft system 10 to carry more payload, to be smaller and/or to provide other benefits known to those skilled in the art. In addition, the channelized output from photonic circuit 14 may be carried on optical fibers or other optical connections that are smaller, lighter and more flexible than traditional RF coaxial cables. According to a non-limiting example, photonic circuit 14 is able to put a full frequency band of RF signals (e.g., 2 GHz-18 GHz) onto optical signals and send those signals over optical connections to various destinations within the aircraft.

It is to be understood that the foregoing description is not a description of the invention itself, but of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

What is claimed is:

1. A photonic circuit, comprising:
a circuit input configured to receive radio frequency (RF) signals;
a modulator coupled to the circuit input and configured to receive the radio frequency (RF) signals;
an optical source coupled to the modulator and configured to provide optical signals, the modulator and the optical source being arranged to work together to modulate the radio frequency (RF) signals received from the circuit input onto the optical signals provided by the optical source;
a filter array coupled to the optical source and configured to receive the optical signals, the filter array including a plurality of filters configured to channelize the optical signals received from the optical source in order to provide channelized optical signals; and
a circuit output coupled to the filter array and configured to receive the channelized optical signals, wherein two or more of the modulator, the optical source, or the filter array are combined on a single monolithic chip so that they generally experience iso-thermal conditions, and the photonic circuit provides for the transmission of radio frequency (RF) content in the optical domain.

2. The photonic circuit of claim 1, wherein the modulator is an optical absorption modulator or a Mach-Zehnder Interferometer that uses amplitude modulation to provide for the transmission of radio frequency (RF) content in the optical domain.

3. The photonic circuit of claim 1, wherein the optical source is a wavelength-tunable diode laser that emits light that is modulated for the transmission of radio frequency (RF) content in the optical domain.

4. The photonic circuit of claim 1, wherein the filter array is a cascaded filter arrangement that includes a plurality of optical waveguides coupled to a plurality of optical filters, and each of the optical filters is configured to channelize the optical signals by selecting out an individual channel based on its radio frequency (RF) content.

5. A photonic circuit, comprising:
a circuit input configured to receive radio frequency (RF) signals;
a modulator coupled to the circuit input and configured to receive the radio frequency (RF) signals;
an optical source coupled to the modulator and configured to provide optical signals, the modulator and the optical source being arranged to work together to modulate the radio frequency (RF) signals received from the circuit input onto the optical signals provided by the optical source;
a filter array coupled to the optical source and configured to receive the optical signals, the filter array is a cascaded filter arrangement that includes a plurality of optical waveguides coupled to a plurality of optical filters, each of the optical filters is configured to channelize the optical signals received from the optical source in order to provide channelized optical signals by selecting out an individual channel based on its radio frequency (RF) content, each of the optical filters is a ring filter having its own passband, and each optical filter is configured to place information inside the passband on a drop channel and to place information outside the passband on a bus channel; and
a circuit output coupled to the filter array and configured to receive the channelized optical signals, wherein the photonic circuit provides for the transmission of radio frequency (RF) content in the optical domain.

6. The photonic circuit of claim 5, wherein each of the ring filters is an InGaAsP multi-ring cavity active RF-optical filter having a semiconductor optical amplifier (SOA) embedded within each ring cavity of the ring filter.

7. The photonic circuit of claim 5, wherein each of the ring filters includes a semiconductor optical amplifier (SOA) embedded within each ring cavity of the ring filter, and each semiconductor optical amplifier (SOA) extends by less than 25% of the overall ring length of the ring cavity so as to minimize spontaneous emission noise.

8. The photonic circuit of claim 5, wherein each of the ring filters exhibits a signal-to-noise ratio (SNR) that is >10 dB for a range of input powers and a filter bandwidth that is <5 GHz.

9. The photonic circuit of claim 5, wherein each of the ring filters includes a buried-heterostructure (BH) waveguide.

10. The photonic circuit of claim 5, wherein each of the ring filters includes additional contact pads configured to provide for electro-optic tuning of the ring resonance frequency so that the center frequency of the ring filter can be tuned after fabrication.

11. The photonic circuit of claim 1, further comprising a feedback feature that is coupled to the optical source and provides a center wavelength feedback signal to the optical source so that the center wavelength of the optical source can be locked to the center frequency of the filter array.

12. A photonic circuit, comprising:
a circuit input configured to receive radio frequency (RF) signals;
a modulator coupled to the circuit input and configured to receive the radio frequency (RF) signals;
an optical source coupled to the modulator and configured to provide optical signals, the modulator and the optical source being arranged to work together to modulate the radio frequency (RF) signals received from the circuit input onto the optical signals provided by the optical source;
a filter array coupled to the optical source and configured to receive the optical signals, the filter array including a plurality of filters configured to channelize the optical signals received from the optical source in order to provide channelized optical signals;
a feedback feature coupled to the optical source and configured to provide a center wavelength feedback signal to the optical source so that the center wavelength of the optical source can be locked to the center frequency of the filter array, the feedback feature including a feedback filter optically coupled to the output of the optical source, and a photodiode coupled to the feedback filter and indicating when the optical source is operating at the center frequency of the filter array; and a circuit output coupled to the filter array and configured to receive the channelized optical signals, wherein the photonic circuit provides for the transmission of radio frequency (RF) content in the optical domain.

13. The photonic circuit of claim 1, wherein the circuit input, the modulator, the optical source, the filter array, the circuit output, and a feedback feature are all fabricated on a single monolithic chip so that they generally experience isothermal conditions.

14. The photonic circuit of claim 1, wherein the photonic circuit is part of an aircraft system, comprising:

a front end coupled to the circuit input of the photonic circuit;

an optical connection coupled to the circuit output of the photonic circuit; and an electronic module coupled to the optical connection, wherein the front end is configured to receive incoming energy in the form of radio frequency (RF) signals, the photonic circuit is configured to modulate and channelize the radio frequency (RF) signals so as to provide channelized optical signals, and the optical connection is configured to carry the channelized optical signals from the photonic circuit to the electronic module.

\* \* \* \* \*